(12) United States Patent
Chou et al.

(10) Patent No.: US 7,444,418 B2
(45) Date of Patent: Oct. 28, 2008

(54) TRANSCODING MULTIMEDIA INFORMATION WITHIN A NETWORK COMMUNICATION SYSTEM

(75) Inventors: Jim Chou, Berkeley, CA (US); Kannan Ramchandran, Berkeley, CA (US)

(73) Assignee: Bytemobile, Inc., Mountain View, CA (US)

( * ) Notice: Subject to any disclaimer, the term of this patent is extended or adjusted under 35 U.S.C. 154(b) by 766 days.

(21) Appl. No.: 10/143,441

(22) Filed: May 9, 2002

(65) Prior Publication Data
US 2003/0018796 A1    Jan. 23, 2003

Related U.S. Application Data

(60) Provisional application No. 60/290,269, filed on May 11, 2001.

(51) Int. Cl.
G06F 15/16    (2006.01)

(52) U.S. Cl. .................. 709/231; 709/203; 709/230; 725/111; 725/117

(58) Field of Classification Search ................ 709/231, 709/245, 203, 401, 352, 217–219, 247; 370/351, 370/352, 357, 360, 377; 345/327; 348/722; 707/500.1; 375/240; 725/111
See application file for complete search history.

(56) References Cited

U.S. PATENT DOCUMENTS

| | | | |
|---|---|---|---|
| 5,590,064 A | 12/1996 | Astle | |
| 5,835,495 A | 11/1998 | Ferriere | |
| 6,020,931 A * | 2/2000 | Bilbrey et al. | 348/584 |
| 6,091,777 A * | 7/2000 | Guetz et al. | 375/240.11 |
| 6,134,223 A * | 10/2000 | Burke et al. | 370/265 |
| 6,157,634 A * | 12/2000 | Mehta et al. | 370/351 |
| 6,167,450 A | 12/2000 | Angwin et al. | |
| 6,178,205 B1 | 1/2001 | Cheung et al. | |
| 6,397,230 B1 * | 5/2002 | Carmel et al. | 715/500.1 |
| 6,732,183 B1 * | 5/2004 | Graham | 709/231 |
| 6,987,778 B2 * | 1/2006 | Sindhushayana et al. | 370/468 |
| 2002/0150123 A1 * | 10/2002 | Ro | 370/465 |

FOREIGN PATENT DOCUMENTS

| | | |
|---|---|---|
| WO | WO 00/40046 A | 7/2000 |
| WO | WO 01/03391 A1 | 1/2001 |
| WO | WO 02/093866 A2 | 11/2002 |
| WO | WO 02/093866 A3 | 11/2002 |

OTHER PUBLICATIONS

Chou, J. et al., "A Simple Algorithm for Removing Blocking Artifacts in Block-Transform Coded Images," IEEE Signal Processing Letters, US, vol. 5, No. 2, Feb. 01, 1998, pp. 33-35, XP000736975, ISSN 1070-9908, Paragraphs II and III.

* cited by examiner

*Primary Examiner*—Jude Jean-Gilles
(74) *Attorney, Agent, or Firm*—Wilson Sonsini Goodrich & Rosati

(57) ABSTRACT

Multimedia information communicated between a transmitter and a receiver may be transcoded by intercepting the multimedia information within a network communication system. The available transmission rate of the downlink channel may be estimated by, for example, calculating a ratio of the smoothed round trip time of packets communicated to the receiver and a smoothed congestion window associated with the downlink channel. If the transmission rate at which the multimedia information is encoded is greater than the available transmission rate, the multimedia information may be transcoded to conform the multimedia information to the available transmission rate. The transcoded multimedia information may then be transmitted to the receiver over the downlink channel using a transmission timer.

50 Claims, 7 Drawing Sheets

TRANSCODING MULTIMEDIA INFORMATION WITHIN A NETWORK COMMUNICATION SYSTEM

REFERENCE TO RELATED APPLICATIONS

The present application claims priority from U.S. provisional application No. 60/290,269 filed May 11, 2001. U.S. provisional application No. 60/290,269 is hereby incorporated herein by reference in its entirety.

BACKGROUND

1. Field of Invention

The present invention generally relates to network communication systems, and more particularly, to systems and methods for transcoding multimedia information within a network communication system.

2. Description of Related Art

Multimedia information, such as audio and video, has become a common and increasingly popular form of content transmitted across modern communication networks. In fact, many applications, such as web browsers, media players and digital jukeboxes, have been specifically developed to allow users to download multimedia information from variety of sources and play or display such information on demand. Content providers have also developed a variety of services that enable users to download music, video programming and other information rich content in real time using, for example, sophisticated streaming or multicasting technology. With the predicted increase in demand for such services, multimedia information will likely constitute a significant portion of the data traffic communicated over network communications systems in the future.

This increased demand for multimedia information, however, has highlighted a number challenges associated with the transmission of such information over conventional network communication systems. These challenges stem from the fact that multimedia information is typically encoded at the source at a predetermined transmission rate, with the assumption that the communication channel will always have sufficient bandwidth to support the rate at which the multimedia information is encoded. If multimedia information is encoded at a transmission rate that is greater than the available transmission rate, however, the receiver may be unable receive information at the rate necessary to support the underlying application, thereby causing the application to experience disruption or significantly degraded performance.

These problems have become especially apparent in wireless and other bandwidth constrained networks. Because these networks have physical limitations on the maximum bandwidth that the communication channel can support (which in many cases may be significantly less than the bandwidth supported by conventional wireline links), the assumption that the communication channel will always have sufficient bandwidth to support the required transmission rate may not apply. As a result, these bandwidth constrained networks are susceptible to a mismatch between the required transmission rate of the multimedia information and the available transmission rate of the communication channel. Wireless networks are especially problematic due to the temporary decreases in the available transmission rate caused by rain fades, multipath fading, call handoff, degradation in signal quality and other commonly occurring phenomenon that decrease the available bandwidth.

Conventional TCP architectures employed in data communication networks further exacerbate the foregoing problems by failing to take into account the asymmetric uplink and downlink channels typically employed in wireless and other bandwidth constrained networks. For example, conventional TCP flow control mechanisms utilize an acknowledgement-based approach to regulate the number and timing of new packets transmitted over the communication network. In these implementations, a transmitter maintains a congestion window parameter that specifies the maximum number of unacknowledged packets that may be transmitted to the receiver. As the transmitter receives acknowledgement signals from the receiver, the congestion control mechanism increases the size of the congestion window (and decreases the number of unacknowledged packets), thereby enabling the transmitter to immediately transmit additional packets to the receiver.

The problem with this approach is that it assumes that the network employs symmetric uplink and downlink communication channels that enable data packets and acknowledgement signals to be equally spaced in time. In communication networks, such as wireless communication networks, that employ asymmetric uplink and downlink channels, the available bandwidth towards the receiver may be significantly higher than the available bandwidth towards the transmitter. As a result, the receiver may be unable to access the uplink channel in order to transmit acknowledgement signals to the transmitter in a timely manner. This initial delay in the transmission of acknowledgement signals may cause the transmitter to suspend transmission of additional data packets until additional acknowledgement signals are received, and then transmit a large burst of packets in response to the transmitter receiving a large group of acknowledgement signals. As a result, these acknowledgement-based approaches may underestimate the available transmission rate on the downlink channel and result in data being transmitted to the receiver in large bursts, thereby causing multimedia applications requiring a steady flow of data at a predetermined transmission rate to experience unusually poor performance.

Therefore, in light of the problems associated with existing approaches, there is a need for improved systems and methods for communicating multimedia information over a network communication system.

SUMMARY OF THE INVENTION

Embodiments of the present invention alleviate many of the foregoing problems by providing systems and methods for transcoding multimedia information within a network communications system. In one embodiment of the present invention, multimedia information is transcoded by intercepting multimedia information communicated between a transmitter and a receiver, where the multimedia information is encoded at the transmitter at a first transmission rate. The available transmission rate of the downlink channel is then estimated by, for example, taking a ratio of a smoothed round trip time of data packets communicated to the receiver and a smoothed congestion window parameter associated the downlink channel. If the first transmission rate is greater than the available transmission rate, the multimedia information is transcoded to conform the multimedia information to the available transmission rate. A transmission timer may then be used to transmit the transcoded multimedia information to the receiver at the estimated transmission rate.

In another embodiment of the present invention, multimedia information may be transcoded using a service module disposed within the network communication system. In this embodiment, the service module may be configured to break a connection between the transmitter and the receiver to form a first channel between the transmitter and the service module and a second channel between the service module and the receiver. The multimedia information communicated from the transmitter to the receiver may then be redirected to the service module via the first channel to enable the service module to transcode the multimedia information based on an estimation of the available transmission rate of the second channel. If the transmission rate at which the multimedia information is encoded is greater than the available transmission rate, the service module transcodes the multimedia information to conform the multimedia information to the available transmission rate. The transcoded multimedia information may then be transmitted from the service module to the receiver over the second channel. This embodiment of the present invention provides certain advantages in that the multimedia information may be transcoded in a manner transparent to the transmitter and receiver. For example, because the first channel and the second channel may comprise separate and distinct channels, the service module may be configured to act as a client with respect to the transmitter and a server with respect to the receiver, thereby enabling the multimedia information to be transcoded without requiring any modification of the transmitter or requiring the receiver to explicitly direct service requests to the service module.

Other embodiments of the present invention provide a number of alternative mechanisms for transcoding the multimedia information, where each embodiment provides certain advantages in terms of the quality of the resulting signal and associated computational intensity. One embodiment, for example, transcodes the multimedia information by decoding the multimedia information and then re-encoding the decoded multimedia information at a lower transmission rate. This embodiment offers the potential for the highest quality transcoded signal, but may involve fairly intensive and time-consuming computation. In another embodiment, the multimedia information may be transcoded by multiplexing between a plurality of versions of the multimedia information that are encoded at a different transmission rate. By multiplexing frames from different versions of the multimedia information, this process may be configured to form a sequence of frames having an average transmission rate that approximates the available transmission rate. In yet another embodiment, transcoding may be performed by removing high frequency code words from selected frames of the multimedia information until the transmission rate of the transcoded data stream approximates the available transmission rate. This approach effectively applies a low pass filter to the multimedia information, which reduces the amount of data required to be transmitted and preserves the more perceptually relevant lower frequency data. In still another embodiment, transcoding may be performed by mapping code words from selected frames of the multimedia information to a decimated set of code words having coarser quantization. Although this approach reduces the resolution of the resulting data, it preserves a significant portion of the high frequency information.

Each of foregoing embodiments information may be applied to a sequence of frames of the multimedia information such that the frame sequence has an average transmission rate that approximates the available transmission rate. For example, these embodiments may be configured to apply the same transmission rate to each frame in the frame sequence. Alternatively, different frames in the frame sequence may be encoded at different transmission rates such that the average transmission rate of the frame sequence approximates the available transmission rate. In this alternative embodiment, the sequence of frames may be transcoded such that frames that occur earlier in the frame sequence are transcoded at a higher transmission rate than frames that occur later in the frame sequence. In an alternative embodiment, the sequence of frames may be transcoded such that frames having a higher perceptual entropy are transcoded at a higher transmission rate than frames having a lower perceptual entropy. The transcoded multimedia information may then be transmitted to the receiver at the estimated transmission rate of the downlink channel using a transmission timer.

By transcoding the multimedia information and using timer-based data flow control to regulate data transmission, embodiments of the present inventions alleviate many of problems commonly associated with conventional data communication networks. For example, embodiments of the present invention may be configured to ensure that multimedia information is encoded at a transmission rate that the downlink channel can support. These aspects of the present invention offer significant advantages by ensuring that the receiver will be able to process received multimedia information at a rate necessary to support the underlying application. Furthermore, because the transcoded multimedia information may be transmitted to the receiver using timer-based data flow control, this timer-based approach, together with the smoothing that may used to compute the estimated transmission rate, offers a more relevant estimate of the available transmission rate and may reduce or eliminate the bursty transmissions commonly associated with the acknowledgement-based approach employed by conventional TCP architectures.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION

Embodiments of the present invention provide systems and methods for transcoding multimedia information within a network communication system. The following description is presented to enable a person skilled in the art to make and use the invention. Descriptions of specific applications are provided only as examples. Various modifications, substitutions and variations of the preferred embodiment will be readily apparent to those skilled in the art, and the generic principles defined herein may be applied to other embodiments and applications without departing from the spirit and scope of the invention. Thus, the present invention is not intended to be limited to the described or illustrated embodiments, and should be accorded the widest scope consistent with the principles and features disclosed herein.

It is also understood that although embodiments of the present invention are described in the context of a wireless communication system, the principles of the present invention are not limited to wireless networking environments. Rather, the principles of the present invention are equally applicable to other types of networking environments, such as the Internet and other wireline networks. Furthermore, the principles of the present invention are generally applicable to receiver devices that receive multimedia information and transmitter devices that transmit multimedia information and are not limited to the wireless clients and servers illustrated and described herein. Therefore, the described and illustrated embodiments are provided for the purposes of illustration and not limitation.

Figure 1A:
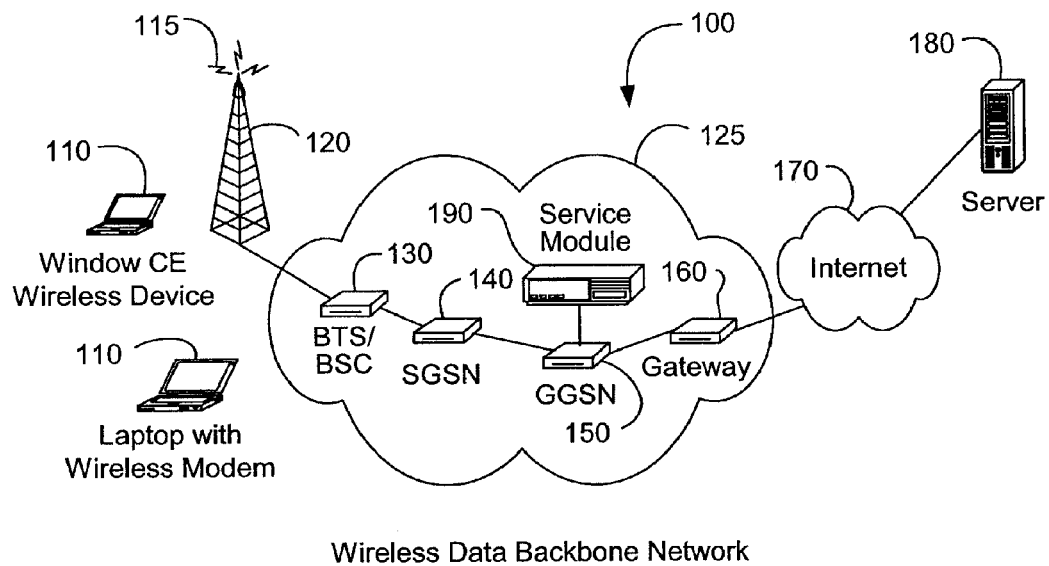
FIGS. 1A and 1B illustrate exemplary network communication systems in which the principles of the present invention may be advantageously practiced.

Referring to FIG. 1A, an exemplary network communication system in which the principles of the present invention may be advantageously practiced is depicted generally at 100. The exemplary system includes a wireless client 110, such as a personal digital assistant or laptop computer equipped with a wireless modem, that communicates with a server 180 via a wireless backbone network 125 and the Internet 170. In this exemplary system, the wireless backbone network 125 employs a General Packet Radio Service (GPRS) architecture. Accordingly, in order to communicate with the server 180 on the uplink, the wireless client 110 communicates with a base station 120 located within the wireless client's assigned cell. The base station 120 then forwards data and signaling information received from the wireless client 110 through the wireless backbone network 125 via a base transceiver station 130, a serving GPRS support node (SGSN) 140, a gateway GPRS support node (GGSN) 150 and a gateway 160. The gateway 160 acts as an interface between the wireless backbone network 125 and nodes within the Internet 170 and enables information to be transceived between wireless clients 110 coupled to the wireless backbone network 170 and servers 180 coupled to the Internet 170. On the downlink, information is routed through the Internet 170 and wireless backbone network 125 from the server 180 toward the wireless client 110. Once the information is received by the base station 120, the information is transmitted to the wireless client 110 over a wireless channel 115.

Because the wireless channel 115 has a limited bandwidth, the exemplary network communication system of FIG. 1A may be unable to support transmission of multimedia information, such as audio or video, due to the mismatch between the transmission rate at which the multimedia information is encoded and the available transmission rate of the wireless channel 115. For example, in order to transmit MPEG Audio Layer 3 (MP3) audio data to the wireless client 110, the data source typically encodes the audio stream at fixed multiples of 8 kbps, with supported transmission rates ranging from 32 kbps to 320 kbps. If the available transmission rate of wireless channel 115 cannot support the rate required by the MP3 audio stream, the wireless client 110 may be unable to receive data at a rate required to sustain the underlying application. As a result, the application may experience disruption in operation, gaps in the audio playback, or other degradation in quality or performance.

Figure 1B:
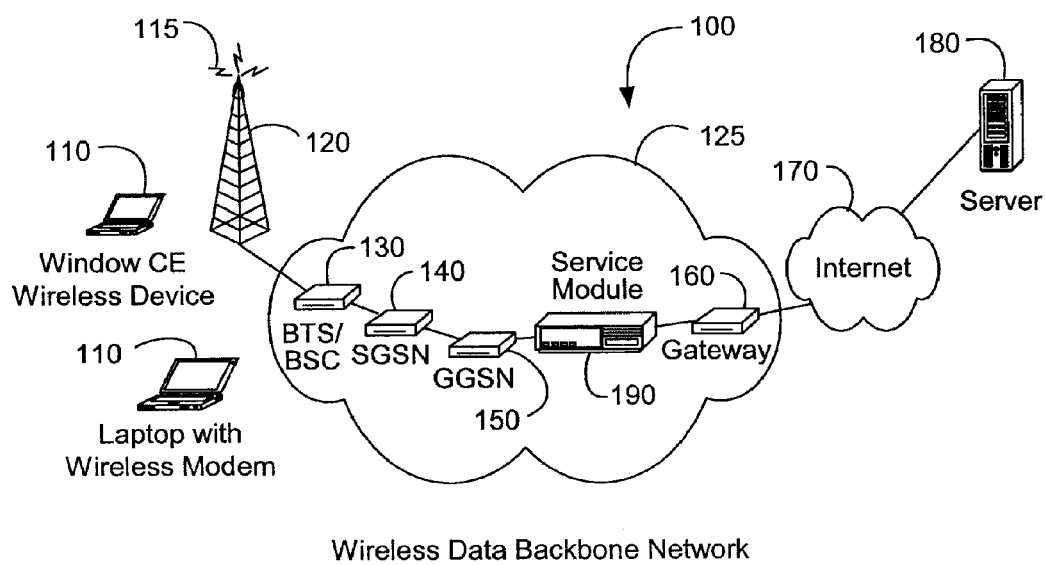

Embodiments of the present invention alleviate these problems by incorporating a service module 190 within the network infrastructure between the wireless client 110 and server 180. As illustrated in FIG. 1A, for example, the service module 190 may be deployed in an offload configuration that enables the service module 190 to process packets of the multimedia information forwarded from a network node, such as a GGSN 150. The configuration of FIG. 1A may be advantageous in that it enables the service module 190 to conform to less stringent reliability requirements, and allows the service module 190 to be periodically taken off-line for hardware or software upgrades or periodic maintenance without disabling links between adjacent nodes. In an alternative embodiment illustrated in FIG. 1B, the service module 190 may be arranged in an inline configuration between network nodes such that packets of the multimedia information are routed through the service module 190. This inline configuration may also be advantageous in that it may minimize packet processing delays by enabling the service module 190 to process packets without traversing through an intermediate network node. Other embodiments may directly incorporate functionalities of the service module 190 within a network node, such as a GGSN 150, SGSN 140, gateway 160, base transceiver station 130 or the like, in order to enhance the processing capabilities of conventional network nodes or reduce the overhead associated with maintaining separate pieces of equipment.

In operation, the service module 190 may be configured to transcode multimedia information communicated from the server 180 to the wireless client 110 to conform the multimedia information with the available transmission rate of the downlink channel. This process may involve intercepting at the service module 190 multimedia information communicated from the server 180 to the wireless client 110. The service module 190 may then estimate the available transmission rate of the downlink channel by, for example, taking a ratio of a smoothed round trip time of data packets communicated from the service module 190 to the wireless client 110 and a smoothed congestion window parameter associated the downlink channel. If the transmission rate at which the multimedia information is encoded is greater than the estimated available transmission rate, the service module 190 transcodes the multimedia information to conform the multimedia information to the available transmission rate. A transmission timer incorporated in the service module 190 may then be used to transmit the transcoded multimedia information to the wireless client 110 at the estimated transmission rate of the downlink channel.

In another embodiment, the service module 190 may be further configured to break the end-to-end connection between the server 180 and the wireless client 110 to form a server-side connection between the server 180 and the service module 190 and a client-side connection between the service module 190 and the wireless client 110. The original multimedia information communicated from the server 180 to the wireless client 110 may then be redirected to the service module 190 via the server-side connection, and the transcoded multimedia information may be communicated from the service module 190 to the wireless client 110 via the client-side connection. Because the service module 190 may be configured to transmit information to the server 180 using the source address and source port associated with the wireless client 110 and transmit the transcoded information to the wireless client 110 using the source address and source port associated with the server 180, the transcoding process may be performed by service module 190 in a manner transparent to the server 180 and wireless client 110 and without requiring modification of either device.

By transcoding the multimedia information and using timer-based data flow control to regulate data transmission, the service module 190 ensures that multimedia information is encoded at a transmission rate that the downlink channel can support, thereby ensuring that the wireless client 110 will be able to process received multimedia information at a rate necessary to support the underlying application. Furthermore, because the transcoded multimedia information may be transmitted to the wireless client 110 using timer-based data flow control, this timer-based approach, together with the smoothing that may used to compute the transmission rate, offers a more relevant estimate of the available transmission rate and may reduce or eliminate the bursty transmissions commonly associated with the acknowledgement-based approach employed by conventional TCP architectures.

Figure 2:
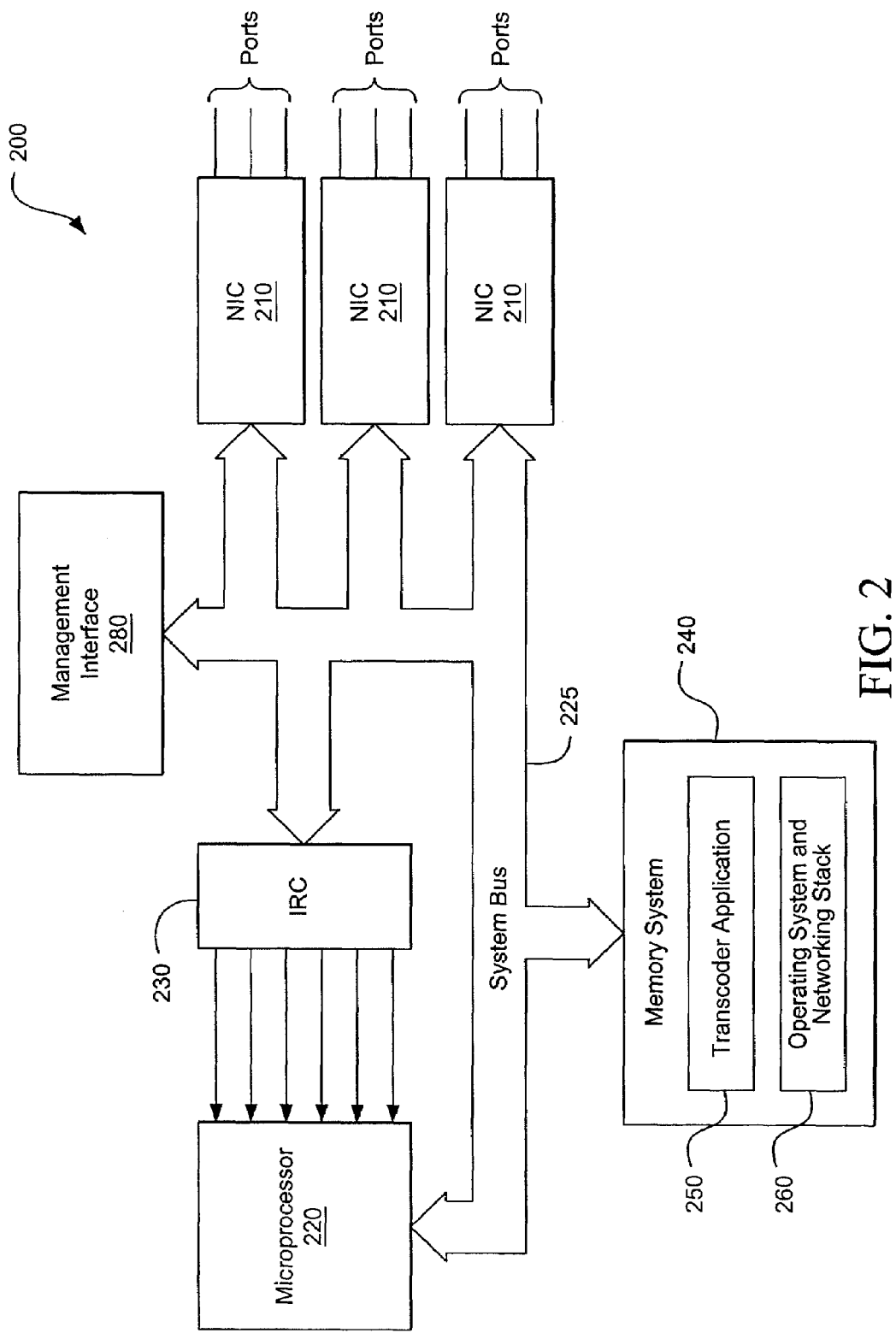
FIG. 2 illustrates an exemplary service module platform that may be used in accordance with embodiments of the present invention.

Referring to FIG. 2, an exemplary service module platform that may be used in accordance with embodiments of the present invention is depicted generally at 200. As illustrated, the exemplary platform includes one or more network interface cards 210 for interfacing with other nodes within the network, such as a base transceiver station, a SGSN, a GGSN, a gateway or the like. The network interface cards 210 are coupled to a processor 220 via a system bus 225. The processor 220 is also coupled to a memory system 240, such as a random access memory, a hard drive, a floppy disk, a compact disk, or other computer readable medium, which stores an operating system and networking stack 260 and a transcoder application 250. The exemplary platform may also include a management interface 280, such as a keyboard, input device or port for receiving configuration information, that may be used to selectively modify configuration parameters within the operating system and networking stack 250 and the transcoder application 250 without requiring the modules to be re-compiled.

In operation, the network interface cards 210 generate a system interrupt to the interrupt controller 230 in response to the network interface card 210 receiving a data packet. The interrupt controller 230 then passes the interrupt to the processor 220 in accordance with the interrupt's assigned priority. Once the interrupt is received by the processor 220, the interrupt causes the processor 220 to execute interrupt handlers incorporated within the operating system and networking stack 260 to process the received packet. These modules may provide operating system functions and other functions associated with the applicable protocol, such as TCP/IP or UDP/IP. Embodiments of the present invention may also incorporate other functionalities within the operating system and networking stack 260, such as functionalities for classifying the connection, breaking the connection between the wireless client and the server, and generating source addresses for outgoing packets as will be discussed in greater detail below. If the received packets correspond to multimedia information, the packets may be forwarded to the transcoder application 250 which buffers the received multimedia information. The transcoder application 250 may then transcode the buffered multimedia information and forward the transcoded multimedia information to the wireless client via an output port on the network interface cards 210.

Figure 3A:
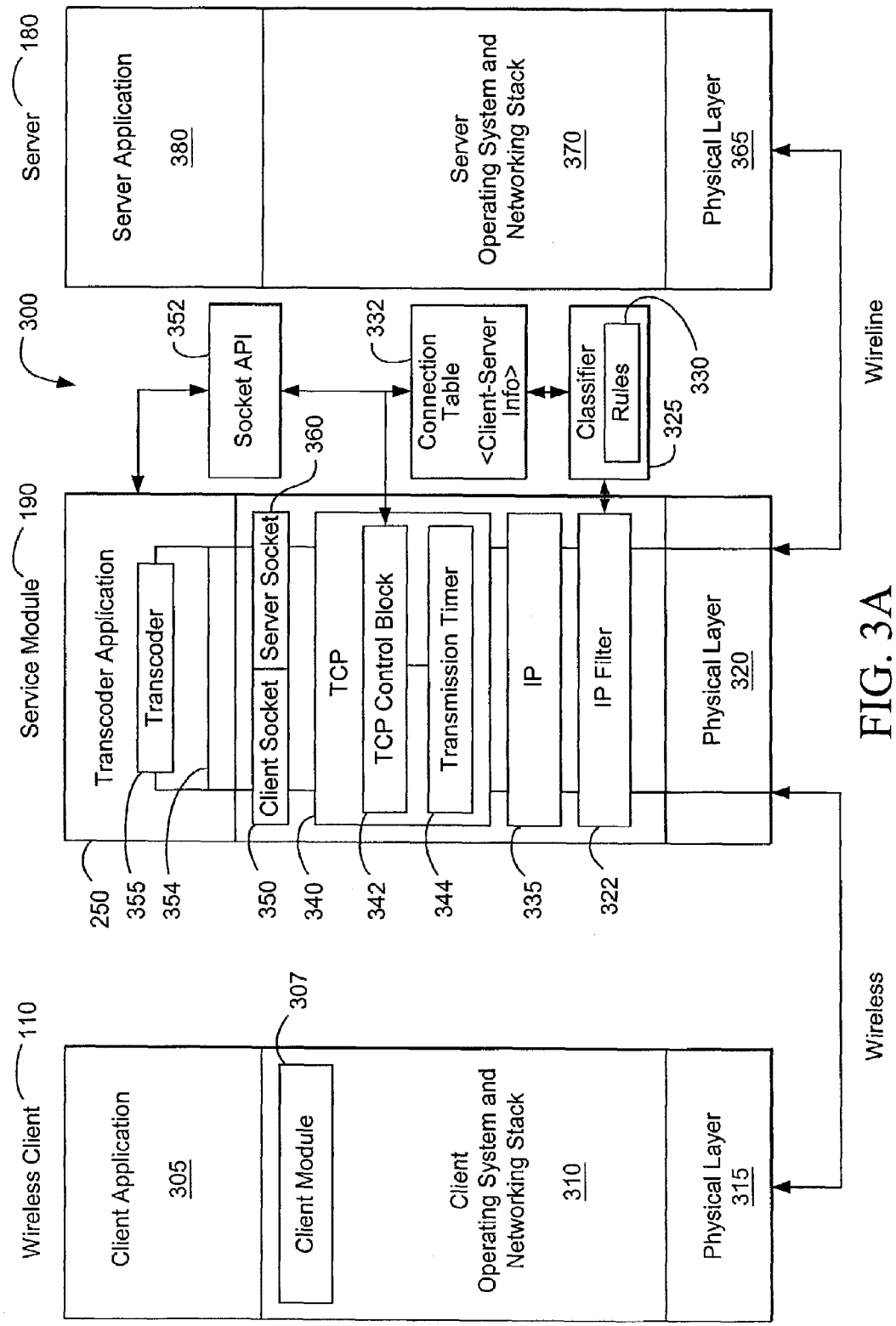
FIGS. 3A and 3B illustrates functional block diagrams of an exemplary system for transcoding multimedia information in accordance with embodiments of the present invention.

Referring to FIG. 3A, a functional block diagram of an exemplary system in accordance with one embodiment of the present invention is illustrated generally at 300. The exemplary system includes a service module 190 having a physical layer 320, an operating system and networking stack 260 and a transcoder application 250. As packets are received by the physical layer 320, the physical layer 320 initiates a interrupt to the operating system and networking stack 260 to process the received packet. An IP filter layer 322 within the operating system and networking stack 260 then initiates a classifier 325 to classify the received packet in accordance with a set of classification rules 330 to determine whether the packet corresponds to the transcoding services provided by the service module 190. These classification rules 330 may comprise one or more masks that are applied to the packet header, such as the source address, destination address, source port, destination port, protocol field and device ID, to determine whether the packet header matches a predetermined service criteria. For example, the classification rules 330 may be configured to mask the source address to determine whether the packet header corresponds to a subscriber of transcoding services. Alternatively, the classification rules 330 may mask the destination port to determine whether the service requested by the incoming packet corresponds to a well-known port, such as port "80" used for designating web-based service requests. More sophisticated classification rules 330 may be applied to combinations of packet header fields to determine whether the packet header corresponds to a particular subscriber that is requesting a particular service from a particular destination, and so on. In addition, because multimedia information can be associated with a wide variety of sources, destinations and ports that may be difficult to ascertain in advance, the classifier 325 may include a default classification rule that is triggered when the packet header does not match any other classification rule in order to enable the packet to be passed to the transcoder application 250 for further examination.

If the packet matches a classification rule (or if the default classification rule is triggered), the classifier 325 redirects the packet to the transcoder application 250 by modifying the packet header to replace the original destination address and destination port with a destination address and destination port associated with the transcoder application 250. The classifier 325 then returns the modified packet to the IP filter layer 322, which forwards the modified packet to the IP and TCP layers 335, 340 for processing. The classifier 325 also stores the original packet header information (along with the redirected destination address and destination port) within a connection table 332 to enable the classifier 325 and the transcoder application 250 to access the original packet header information at a later time, as will be described hereinbelow.

Because the modified packet header includes a destination address and destination port associated with the transcoder application 250, the IP and TCP layers 335, 340 process the modified packet as though the packet were terminated at the transcoder application 250. As a result, the IP and TCP layers 335, 340 unpack the modified packet and pass the packet data to the operating system and networking stack 260. For packets corresponding to a new connection from a new source (typically the wireless client 110), the operating system and networking stack 260 forwards the packet data to a client socket 350 that the transcoder application 250 previously established to receive new connections. The operating system and networking stack 250 also sets a flag to inform the transcoder application 250 that a new connection has been requested. Once the transcoder application 250 accepts the new connection, subsequent packets from the same source to the same destination are similarly redirected and forwarded by the operating system and networking stack 260 to that client socket 350. The transcoder application 250 may then access data communicated from the source by performing a read operation on the client socket 350 and send data to the source by performing a write operation on the client socket 350.

In order to provide a connection to the original destination (typically the server 180), the transcoder application 250 initiates a socket API 352 that searches the connection table 332 based on the source address and redirected destination address associated with the client socket 350. This search of the connection table 332 enables the transcoder application 250 to recover the original packet header information before the destination information was modified by the classifier 325 during the redirection process. Once the transcoder application 250 retrieves the original packet header information, the transcoder application 250 may then open a server socket 360 using the original destination address and destination port. This process opens a separate connection between the transcoder application 250 and the original destination to enable data to be communicated between the destination and the transcoder application 250. The transcoder application 250 also initiates another call to the socket API 352 to create a new entry within the connection table 332 that stores the original packet header information (that was retrieved by transcoder application 250), along with the redirected destination address and destination port associated with the server socket 360. Once the server socket 360 is established, the transcoder application 250 may then receive data from the destination by performing a read operation on the server socket 360 and send data to the destination by performing a write operation on the server socket 360.

Once the client socket 350 and server socket 360 have been established and the connection information associated with each socket has been stored in the connection table 332, the classifier 325 may then classify subsequent packets by searching the connection table 332 to determine whether the packets correspond to an on-going connection. If the packet header of an incoming packet matches an entry stored in the connection table 332, the classifier 325 may then access the redirected destination address and destination port stored in the connection table 332 and modify the destination address and destination port of the packet header as described above. If the incoming packet does not match an entry stored in the connection table 332, the classifier 325 may classify the packet in accordance with the classification rules 330 to determine whether to redirect the packet to the transcoder application 250. By performing an initial search of the connection table 332, however, the classifier 325 may avoid the need to re-classify additional packets corresponding to an on-going connection (which may comprise the majority of packets forwarded to or through the service module 190).

For write operations performed on the client socket 350 and the server socket 360, the corresponding data flows through the TCP and IP layers 340, 335 as though the data originated from the transcoder application 250. As a result, the TCP and IP layers 340, 335 may generate packets having a source address and source port associated with the transcoder application 250. In order to ensure that the packets are properly recognized and processed by the original source and the original destination (which may be a problem in the event the source and/or destination are behind a firewall that limits access to particular source addresses or a particular range of source addresses), the IP filter layer 322 initiates a call to the classifier 325 to modify outgoing packets to replace the source address and source port with the original source address and source port associated with the end-to-end connection. For packets addressed from the client socket 350, for example, the classifier 325 searches the connection table 332 based on the information included in the packet header of the outgoing packet to determine the original packet header information associated with the client socket 350. The classifier 325 then modifies the outgoing packet to replace the source address and source port with the original network address and port associated with the destination and returns the modified packet to the IP filter layer 322 such that the outgoing packet to the source appears to originate from the destination. For outgoing packets addressed from the server socket 350, the classifier 325 similarly searches the connection table 332 for the original packet header information associated with the server socket 360 (that was stored by the transcoder application 250) and modifies the packet header of the outgoing packet by replacing the source address and source port fields with the original network address and port associated with the source such that the outgoing packet to the destination appears to originate from the source. Accordingly, because packets transmitted from the service module 190 include the original source and destination addresses and original source and destination ports, the original source and the original destination are unaware that the service module 190 intercepted the packets and (possibly) performed intermediate processing on the transmitted data.

The foregoing process essentially breaks the end-to-end connection between the wireless client 110 and the server 180 by terminating the connection with the wireless client 110 at the transcoder application 250 to form a client-side connection 356 and opening a separate connection between the transcoder application 250 and the server 180 to form a server-side connection 357. Because the client-side connection 356 and the server-side connection 357 constitute separate and independent channels, the transcoder application 250 may be configured to act like a server with respect to the wireless client 110 and a client with respect to the server 180. For example, the transcoder application 250 may be configured to forward connection-related data, such as connection establishment and user authentication messages, between the client-side connection 356 and the server-side connection 357 by reading the data from the client-side connection 356 and writing the data to the server-side connection 357 and vice versa (as indicated generally by line 354) in order to maintain semantics for the end-to-end connection. Alternatively, if the transcoder application 250 determines that the data stream constitutes multimedia information (e.g., by examining the format of the data stream or after synching with a predetermined number of frames), the transcoder application 250 buffers the multimedia information within a transcoder 355. Because these data packets are received through a separate connection, the TCP and IP layers 340, 355 automatically send acknowledgement messages back to the source (typically the server 180) so that the source will continue to send data corresponding to the multimedia information. The transcoder 355 may then transcode the buffered multimedia information in accordance with the available transmission rate and reinsert the transcoded multimedia information into the data stream by writing the information to the appropriate client-side connection 356 or server-side connection 357.

In order to enable the transcoder application 250 to transcode the multimedia information, the TCP layer 340 of the service module 190 stores certain parameters for estimating the available transmission rate of the client-side connection 356 and the server-side connection 357. More particularly, as packets are transmitted from the service module 190 to the receiver, the TCP layer 340 measures the round trip time of the data packets (from the time the packet is transmitted until an associated acknowledgement signal is received) and maintains a congestion window parameter (that determines the maximum number of unacknowledged packets that may be transmitted to the receiver). The TCP layer 340 then calculates a smoothed round trip time based on the average and maximum deviation of a plurality of round trip time samples and a smoothed congestion window based on the average and maximum deviation of a plurality of congestion window samples. The estimated transmission rate of the client-side connection 356 or server-side connection 357 may then be determined by taking a ratio of the smoothed round trip time and the smoothed congestion window. The TCP layer 340 then stores the estimated transmission rate in the TCP control block 342 for each connection to enable the transcoder application 250 to retrieve the estimated transmission rate via the socket API 352. The estimated transmission rate is also used to set the period of the transmission timer 344 which regulates the timing of data packet transmissions such that packets are transmitted over the client-side connection 356 or server-side connection 357 at the estimated transmission rate for that connection.

During exemplary communication sessions, a client application 305 associated with the wireless client 110 requests a download of multimedia information, such as an MP3 audio file, from a server application 380 associated with the server 180. As packets addressed between the client application 305 and the server application 380 flow through the communication network, the service module 250 intercepts the packets and redirects the packets to the transcoder application 250 via the client-side connection 356 or server-side connection 357. The transcoder application 250 then examines the data to determine whether the data constitutes multimedia information by, for example, attempting to synchronize with the data in accordance with a known multimedia format, such as an MP3 data format. If the transcoder application 250 determines that the data does not constitute multimedia information, the transcoder application 250 simply forwards the data to the intended destination by writing the data to the client-side connection 356 or server-side connection 357. On the other hand, if the transcoder application 250 determines that the data received from the server-side connection 357 constitutes multimedia information, the transcoder application 250 accesses the socket API 352 in order to retrieve the current estimated transmission rate of the client-side connection 356 that is stored in the TCP control block 342. The transcoder application 250 then compares the estimated transmission rate with the transmission rate at which the multimedia information was encoded. If the estimated transmission rate is sufficient to support the transmission rate of the multimedia information, the transcoder application 250 simply forwards the data to the client application 305 by writing the data to the client-side connection 356. Otherwise, the transcoder application 250 transcodes the multimedia information to conform the multimedia information to the estimated transmission rate and then forwards the transcoded multimedia information to the client application 305 via the client-side connection 356. For each of the foregoing cases, because the transmission timer 344 associated with the client-side connection 356 clocks the transmission of the multimedia information (or transcoded multimedia information) at the estimated transmission rate, the service module 190 alleviates or avoids the problems associated with a mismatch between the rate at which the multimedia information is encoded and the available transmission rate of the client-side connection.

The transcoder application 250 may be further configured to provide a number of alternative mechanisms for transcoding the multimedia information, where each alternative provides certain advantages in terms of the quality of the resulting signal and associated computational intensity. For example, the transcoder application 250 may transcode the multimedia information by decoding the multimedia information and then re-encoding the decoded multimedia information at a lower transmission rate. This embodiment offers the potential for the highest quality transcoded signal, but may involve fairly intensive and time-consuming computation. In another embodiment, the transcoder application 250 may request from the server application 380 a plurality of versions of the multimedia information that are encoded at a different transmission rate and then multiplex between the plurality of versions to form a sequence of frames having an average transmission rate that approximates the estimated transmission rate. In yet another embodiment, transcoding may be performed by removing high frequency code words from selected frames of the multimedia information until the transmission rate of the transcoded data stream approximates the available transmission rate. This approach effectively applies a low pass filter to the multimedia information to reduce the amount of data required to be transmitted, while preserving the more perceptually relevant lower frequency data. In still another embodiment, transcoding may be performed by mapping code words from selected frames of the multimedia information to a decimated set of code words having coarser quantization. Although this approach reduces the resolution of the resulting data, it preserves a significant portion of the high frequency information.

Each of foregoing embodiments information may be applied to a sequence of frames of the multimedia information such that the frame sequence has a long-run average transmission rate that approximates the available transmission rate. For example, these embodiments may be configured to apply the same transmission rate to each frame in the frame sequence. Alternatively, different frames in the frame sequence may be encoded at different transmission rates such that the average transmission rate of the frame sequence approximates the available transmission rate. In this alternative embodiment, the sequence of frames may be transcoded such that frames that occur earlier in the frame sequence are transcoded at a higher transmission rate than frames that occur later in the frame sequence. In an alternative embodiment, the sequence of frames may be transcoded such that frames having a higher perceptual entropy are transcoded at a higher transmission rate than frames having a lower perceptual entropy. The transcoded multimedia information may then be transmitted to the client application 305 at the estimated transmission rate of the client-side connection 356 using the transmission timer 344.

Because the outgoing packets include the original source and destination addresses and the original source and destination ports associated with the end-to-end connection, the physical layer 315 and operating system and networking stack 310 of the wireless client 110 will process received packets as though the packets were transmitted directly from the server 180 and vice versa. As a result, the transcoding process can be performed without requiring modification of the physical layers 315, 365 and operating systems and networking stacks 310, 370 of the wireless client 110 and server 180. However, if the wireless client 110 includes a compatible client module 307, the transcoder application may be configured to incorporate additional features into the data stream. For example, the transcoder application 250 may be configured to embed forward error correction (FEC) codes into frames of the transcoded multimedia information to allow the client module 307 to detect and correct errors in the received data (which may be especially advantageous in the event the data is communicated via a UDP/IP protocol). The transcoder application 250 may also embed synchronization information to enable the client application 305 to synchronize or re-synchronize with the data stream in the event an error occurs during transmission and/or embed ancillary information regarding the data stream, such as the track, musical artist, year recorded, etc. The foregoing information may be simply appended to the end of the data stream. Alternatively, the information may be embedded in the data stream (e.g., using a water marking technique) such that wireless clients that include a compatible client module 307 will be able to utilize the embedded information, while wireless clients without a compatible client module 307 will not notice that the information has been embedded (other than a potentially small amount of distortion). The classifier 325 may also be configured with classification rules 330 that match the source or destination address with a predetermined set of addresses of wireless clients 110 that have installed a compatible client module. If the source or destination address matches one of the predetermined set addresses, the classifier 325 may redirect the data stream to a transcoder application 250 that embeds the foregoing information. Otherwise, the classifier forwards the data stream to a separate transcoder application 250 that does not embed the foregoing information.

Figure 3B:
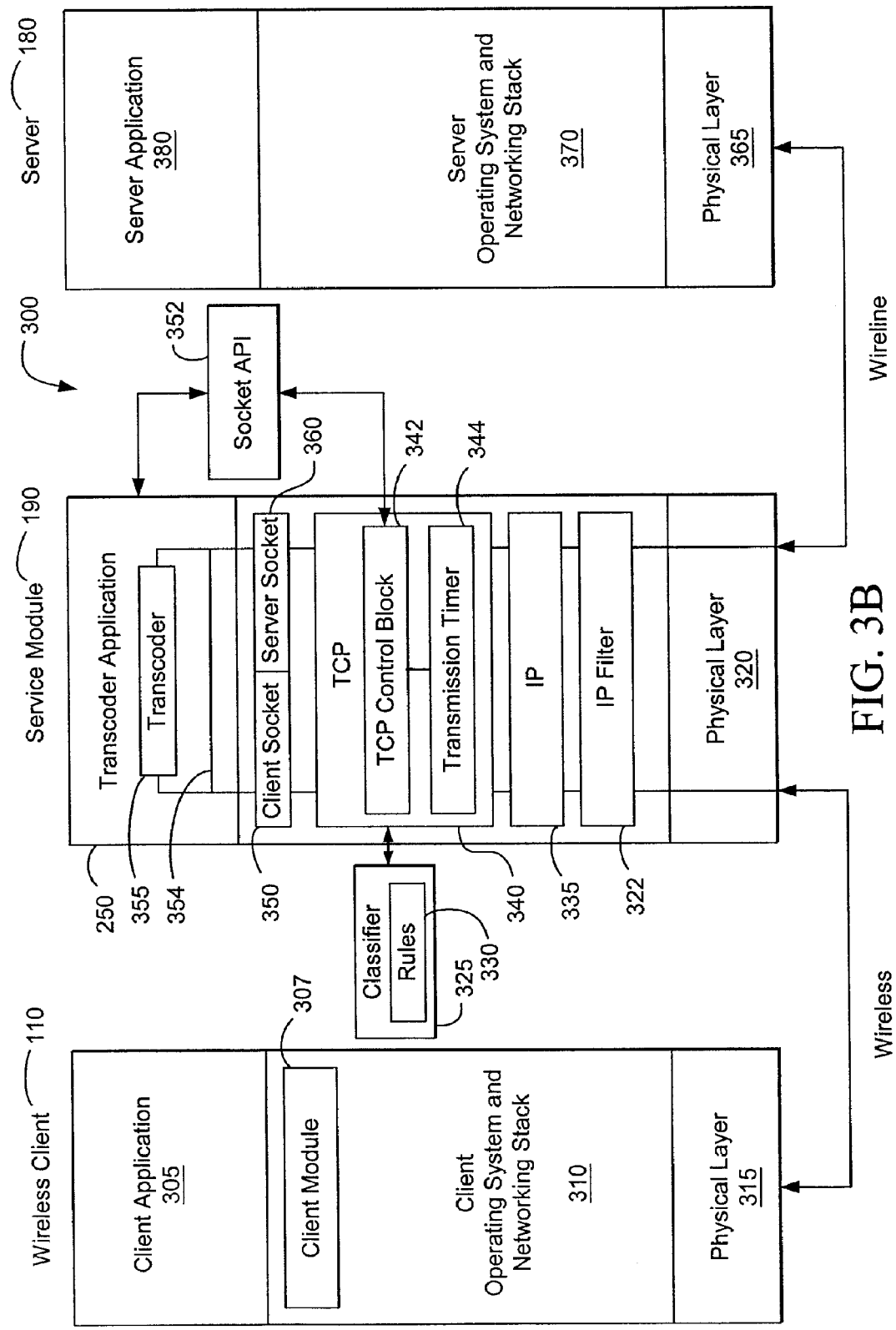

Referring to FIG. 3B, a functional block diagram of an exemplary system in accordance with a second embodiment of the present invention is illustrated generally at 300. The embodiment of FIG. 3B is substantially similar to the embodiment of FIG. 3A and incorporates many of the principles discussed above. The embodiment of FIG. 3B, however, utilizes a more efficient mechanism for classifying connections and redirecting incoming and outgoing data. For example, as the service module 190 receives packets communicated between the wireless client 110 and the server 180, the packets may be directed through the IP filter and IP layers 322, 335 to the TCP layer 340 of the service module 190. For packets corresponding to connection establishment packets, such as SYN packets used in TCP/IP based protocols, the TCP layer 340 calls the classifier 325 to classify the connection establishment packets in accordance with a set of classification rules 330. If the connection establishment packets match a classification rule 330 (or a default classification rule is triggered), the classifier 325 instructs the TCP layer 340 to terminate the connection with the source at the transcoder application 250. The TCP layer 340 then modifies a TCP control block 342 to store the original packet header information received from the source, such as the original source and destination addresses and the original source and destination ports, and a redirected destination address and destination port associated with the transcoder application 250. After the TCP layer 340 completes a three-way handshake with the original source, the operating system and networking stack 260 passes data to a client socket 360 and notifies the transcoder application 250 that a new connection has been requested. Once the transcoder application 250 accepts the new connection, the transcoder application 250 calls a socket API 352 that accesses the TCP control block 342 associated with the client socket 350 to retrieve the original packet header information. The transcoder application 250 then opens a server socket 360 using the original destination address and destination port, and calls the socket API 352 to store the original packet header information, along with the redirected address and redirected port associated with the server socket 360, within a TCP control block 342 associated with the server socket 360.

For subsequent incoming packets corresponding to the same connection, the TCP layer 340 uses the TCP control block 342 to redirect incoming packets addressed from the source to the client socket 350 and to redirect incoming packets addressed from the destination to the server socket 360. The transcoder application 250 may then examine data communicated between the source and destination by reading the client socket 350 and the server socket 360, and send data to the source and destination by writing data to the appropriate client socket 350 and server socket 360. For data written to the client socket 350, the data is passed to the TCP layer 340, which accesses the TCP control block 342 associated with the client socket 350 and generates packets having a source address and source port associated with the original destination. For data written to server socket 360, the TCP layer 340 similarly accesses the TCP control block 342 associated with the server socket 360 and generates packets having a source address and source port associated with the original source. It will be appreciated that the embodiment of FIG. 3B offers advantages over the embodiment of FIG. 3A in that classification only needs to be performed on connection establishment packets. The modification of the TCP control block 342 associated with the client socket 350 and the server socket 360 also enables the TCP layer 340 to redirect incoming packets to the appropriate client socket 350 or server socket 360 and to automatically generate outgoing packets having a source address and source port associated with the original end-to-end connection. As a result, the transcoder application 250 may monitor messages communicated between the wireless client 110 and the server 180 and transparently transcode the multimedia information as described above.

Figure 4:
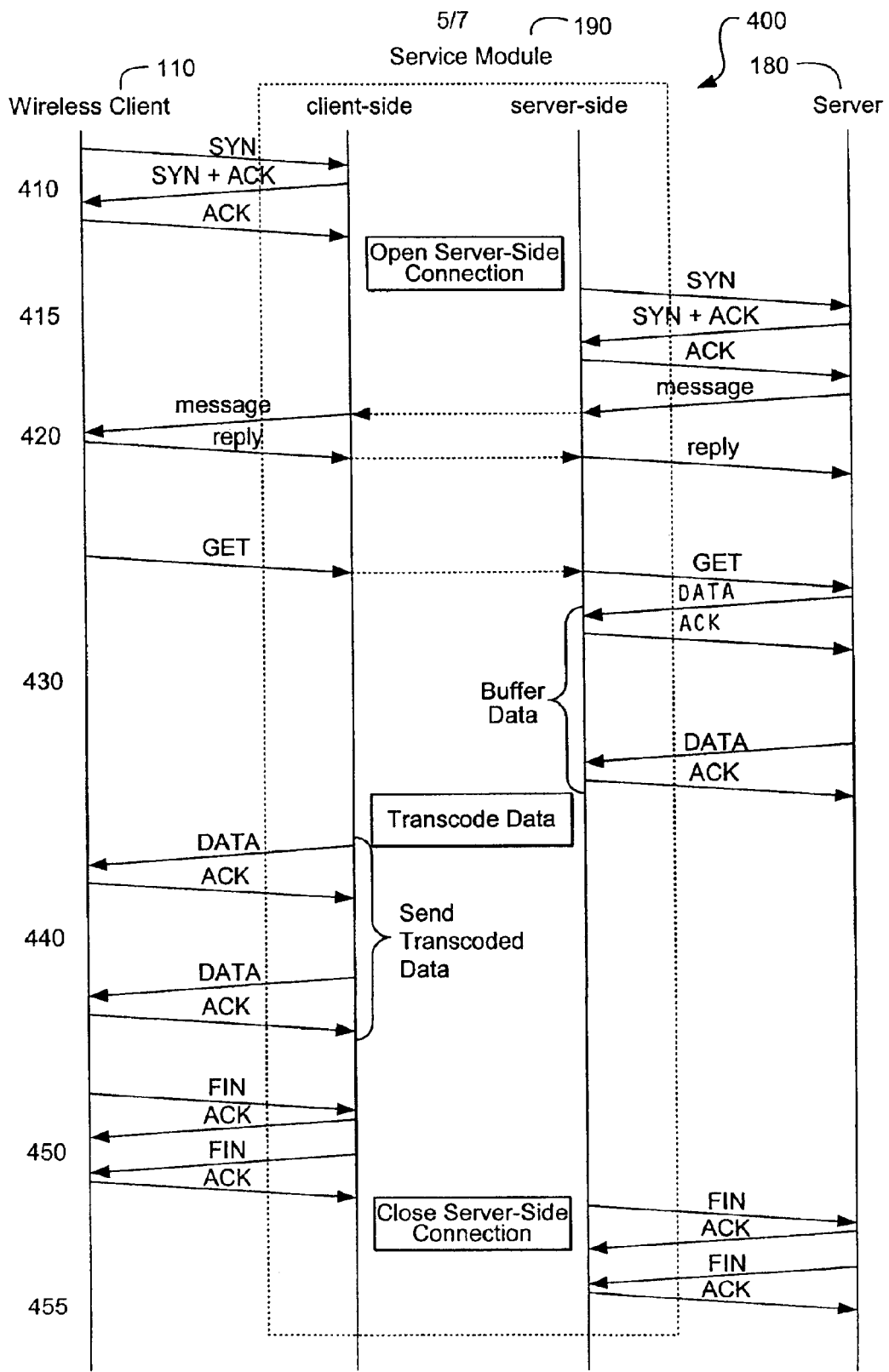
FIG. 4 illustrates a signal flow diagram showing exemplary signals passed between a wireless client, service module and server during an exemplary communication session.

It should be noted that the foregoing description of the embodiments of FIGS. 3A and 3B is presented to enable a person of ordinary skill in the art to make and use the invention. Additional functions and features for the operating system and network stack of the service module are described in U.S. patent application Ser. No. 10/126,131, entitled "Systems and Methods for Providing Differentiated Services Within a Network Communication System", which is incorporated herein by reference. Additional functions and features of the transmission timer and procedures for estimating the transmission rate are described in U.S. patent application Ser. No. 10/061,574, entitled "Data Transport Acceleration and Management Within a Network Communication System", which is also incorporated herein by reference Referring to FIG. 4, a signal flow diagram showing exemplary signals passed between a wireless client, service module and server during an exemplary communication session is illustrated generally at 400. As described above with respect to the embodiments of FIGS. 3A and 3B, packets communicated between the wireless client 110 and the server 180 may be intercepted by the service module 190 and redirected to a transcoder application. As a result, the transcoder application may be configured to monitor data communicated between the wireless client 10 and the server 180 and process the data in accordance with the state of the communication session. For example, the wireless client 110 may initiate a communication session with the server 180 by attempting to engage in a three-way handshake with the server 180 as indicated generally at 410. During this connection establishment state, the service module 190 classifies the connection between the wireless client 110 and the server 180, and terminates the connection with the wireless client 110 at the transcoder application in response to the connection establishment packet (SYN packet) matching a corresponding classification rule. Alternatively, if the multimedia information to be transcoded does not correspond to a defined set of classification rules that can be ascertained in advance, the classifier may automatically terminate all new connections with the transcoder application in order to enable the transcoder application to determine whether the connection corresponds to multimedia information (e.g., by examining the format of the transmitted data).

If the classifier decides to terminate the connection with the wireless client 110 at the service module 190, the operating system and networking stack of the service module 190 completes the three-way handshake with the wireless client 110. Once the client-side connection is accepted by the transcoder application, the transcoder application opens a separate server-side connection with the server 180 using the original destination address and destination port. The operating system and networking stack of the service module 190 similarly completes a three-way handshake with the server 415 as indicated generally at 415. The foregoing process breaks the end-to-end connection between the wireless client 110 and the server 180 to form a client side-connection between the wireless client 110 and the service module 190 and a server-side connection between the service module 190 and the server 180.

Once the service module 190 completes the connection establishment state with the wireless client 110 and the server 180, the communication session may enter a user authentication or initial setup state as indicated generally at 420. The messages communicated between the wireless client 110 and the server 180 during this state vary depending on the particular multimedia application, and some multimedia application may completely eliminate this particular state altogether. In one exemplary user authentication state, the server 180 may send a greeting packet to the wireless client 110 requesting an appropriate user name and password, and the wireless client 110 responds by sending the requested information to the server 180. For these user authentication messages, the transcoder application maintains end-to-end semantics by forwarding messages between the client-side connection and the server-side connection. This process may involve reading the message from the client-side connection and writing the message to the server-side connection and vice versa. Because the service module 190 uses the original source and destination address and source and destination ports for outgoing packets, the wireless client 110 and server 180 respond as though they are communicating with one another.

Once the user authentication or initial setup state is complete, the communication session may then enter a transaction state as indicated generally at 430. During this state the wireless client 110 may request transmission of multimedia content, such as an MP3 audio file or video file, as indicated generally by a GET command. The transcoder application forwards this message to the server 180 by reading the message from the client-side connection and writing the message to the server-side connection. The transcoder application then knows that the data received from the server 180 in response to the GET command will correspond to the requested data. The transcoder application may then buffer the requested data received from the server 180. If the multimedia application does not provide a GET syntax, the transcoder application may simply buffer information received from the server 180 and attempt to synchronize on the received data. If the transcoder application successfully synchronizes with a predetermined number of frames, the transcoder application may then predict with a high degree of certainty that the received information corresponds to multimedia information. In either embodiment, because the server-side connection is a separate connection, the operating system and networking stack of the service module 190 sends acknowledgement messages back to the server 180 in response to each received packet so that the server 180 will continue to send the requested data.

Once a predetermined number of frames of multimedia information has been received, the transcoder application may then transcode the data in accordance with one of the transcoding processes described above. The transcoded data may then be sent to the wireless client 110 by writing the data to the client-side connection. The operating system and networking stack of the service module then packages the data for transmission and transmits the packets in accordance with the period of the transmission timer associated with the client-side connection. Because the client-side connection constitutes a separate connection, the operating system and networking stack of the service module 190 suppresses acknowledgement packet received from the wireless client 110 and retransmits lost packets without notifying the server 180. The separate client-side connection and server-side connection also enables service module 190 to receive a bursty flow of multimedia information from the server 180 at a first transmission rate and transmit a steady flow of transcoded multimedia information to the wireless client 110 at a second transmission rate, thereby alleviating many of the problems associated with conventional network communication systems.

After the transaction state is complete, the communication session may then enter into a close state (as indicated generally at 450) that closes the connections between the wireless client 110 and the server 180. During the close state, the operating system and networking stack of the service module 190 responds to messages received by the wireless client 110 in order to close the client-side connection. The operating system and networking stack then notifies the transcoder application that the client-side connection has been closed, and the transcoder application responds by initiating closure of the server-side connection. The operating system and networking stack of the service module 190 then engages in conventional closure handshakes with the server 180 in order to close the server-side connection as indicated generally at 455.

Figure 5:
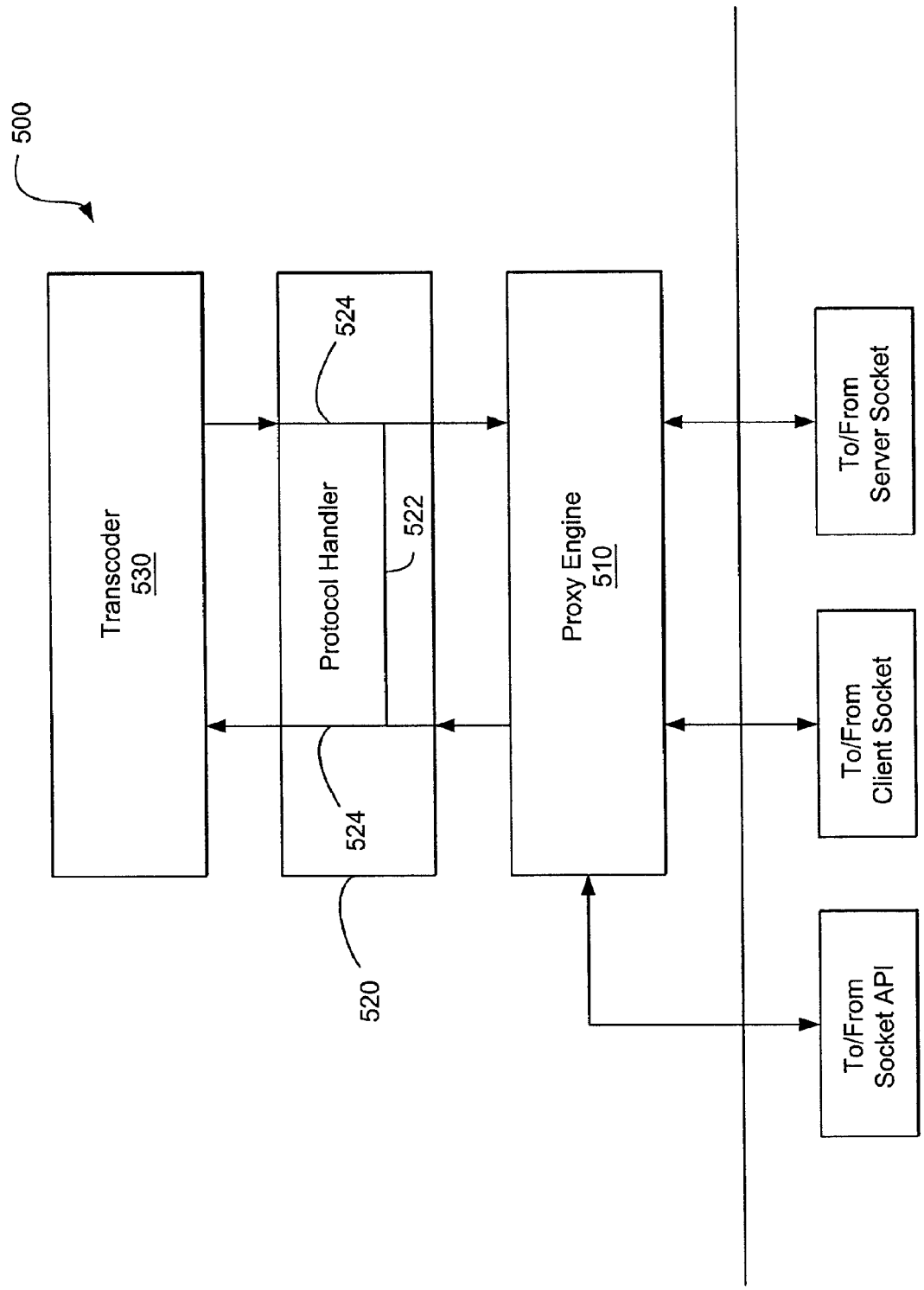
FIG. 5 illustrates a functional block diagram of an exemplary system for supporting multimedia transcoding in accordance with embodiments of the present invention.

Referring to FIG. 5, a functional block diagram of exemplary system for supporting transcoder services in accordance with embodiments of the present invention is illustrated generally at 500. The exemplary system includes a proxy engine 510, a protocol handler 520, and a transcoder 530. The proxy engine 510 acts as an interface between the protocol handler 520 and the operating system and networking stack and manages communication between the client socket and the server socket. During initial connection establishment stages, the proxy engine 510 interacts with the operating system and networking stack to break the connection between the wireless client and the server to form the client-side connection and the server-side connection. For example, the proxy engine 510 may monitor the available client sockets associated with the transcoder 530 and accept new connection requests received from the operating system and networking stack. The proxy engine 510 may then request the original packet header information associated with the client socket from the socket API and open the server socket using the original destination address and destination port. The proxy engine 510 also calls the socket API to either create a new entry in the classification table or modify the TCP control block to store the connection information associated with the server socket. Once the client socket and the server socket have been established, the proxy engine 510 listens to the client socket and server socket for incoming data. The proxy engine 510 then passes data received from the client socket and server socket to the protocol handler 520 and writes the data returned by the protocol handler 520 to the appropriate client socket or server socket.

Once the protocol handler 520 receives data from the proxy engine 510, the protocol handler 520 processes the data to perform the protocol-specific functions associated with the particular multimedia application. For example, the protocol handler 530 may be configured to monitor the data received from the proxy engine 510 and maintain a state machine for the communication session. Based on the state of the communication session, the data may take two paths through the protocol handler 520 as indicated generally by paths 532 and 534. For data corresponding to connection establishment, user authentication and other protocol-specific messages, the protocol handler 520 may update the state machine and pass the data back to the proxy engine 510, which forwards the messages to the originally intended destination by writing the messages to the client socket or server socket. This transfer of data up to the protocol handler 520 enables the protocol handler 530 to monitor the state of the communication session and detect a download of multimedia information. Conversely, the transfer of data down to the proxy engine 510 enables the proxy engine 510 to maintain the end-to-end semantics between the wireless client and the server. If the protocol handler 520 detects a download of multimedia information (e.g. the data was received in response to a GET command), the protocol handler 520 passes the multimedia information to the transcoder 530.

In other embodiments, the protocol handler 520 may be configured to detect multimedia information for multimedia applications that do not utilize well-defined states for the communication session. As mentioned above, the classifier associated the service module may include a default classification rule that causes data communicated between the wireless client and server to be redirected to the transcoder application to determine whether the data corresponds to multimedia information. In these situations, the protocol handler 520 may be configured to attempt to synchronize with the data in accordance with a known multimedia format, such as an MP3 audio format. During this period, the protocol handler 520 processes a copy of the data in accordance with one or more known multimedia formats and passes the original data back to the proxy engine 510 via path 532 in order to maintain the end-to-end connection. If the protocol handler 520 successfully processes a predetermined number of frames in accordance with the known multimedia format, the proxy handler 520 may then determine with a high degree of certainty that the data corresponds to multimedia information. The protocol handler 520 may then pass subsequent data to the transcoder 530 in order to enable the transcoder to provide transcoding services.

Once the transcoder 530 receives the multimedia information, the transcoder 530 initiates a call to the socket API to determine the available transmission rate of the downlink channel. The transcoder 520 then parses the header information of the data received from the protocol handler 520 to determine the transmission rate at which the multimedia information is encoded. If the available transmission rate is greater than the required transmission rate of the multimedia information, the transcoder 530 passes the multimedia information back to the protocol handler 520 and proxy engine 510, where the multimedia information is transmitted to the intended destination. If the available transmission rate is less than the required transmission rate, the transcoder 530 transcodes the multimedia information to conform the multimedia information to the available transmission rate. This process may involve buffering a predetermined number of frames of the multimedia information, such as three to five frames, within the transcoder 530 and processing the frames to provide an average transmission rate of the frame sequence that approximates the available transmission rate. For example, if the available transmission rate is 24 kbps and the multimedia information is encoded at a transmission rate of 32 kbps, the frames in the frame sequence may be transcoded in accordance with one of the transcoding processes described above such that the first frame is encoded at a rate of 24 kbps, the second frame is encoded at 32 kbps, and the third frame is encoded at a rate of 16 kbps. The headers associated with each frame may then be modified to reflect the change in the rate at which the information is encoded, the number of bytes in each frame, and other header information so that the client application will be able to recognize and properly process the transcoded multimedia information. The resulting transcoded frames are then passed to the data handler 520 and proxy engine 510, where the transcoded multimedia information is transmitted to the intended destination. The foregoing process may be repeated for subsequent frames received from the protocol handler 520 in order to enable the transcoder 530 to dynamically adjust the rates at which the multimedia information is encoded to account for fluctuations in the available transmission rate of the downlink channel.

Figure 6:
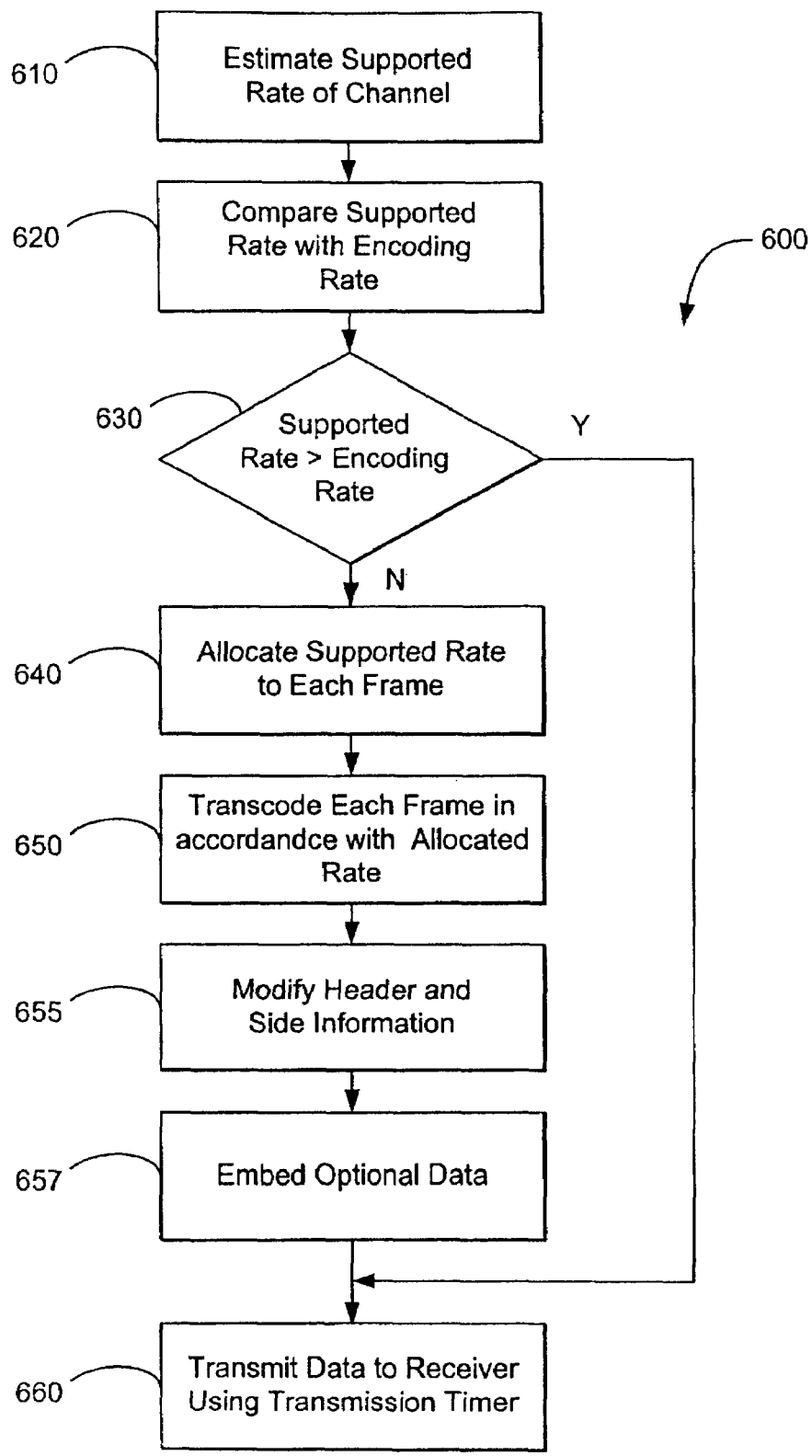
FIG. 6 illustrates a exemplary method in flowchart form for transcoding an MP3 audio stream in accordance with embodiments of the present invention.

Referring to FIG. 6, an exemplary method in flowchart form for transcoding an MP3 audio stream in accordance with embodiments of the present invention is illustrated generally at 600. The exemplary method may be performed in conjunction with the embodiments of FIGS. 1-5 described above in order to conform the MP3 audio stream with the available transmission rate of the downlink channel. Upon receipt of MP3 audio data, the exemplary method may begin at step 610 by estimating the supported transmission rate of the downlink channel. This process may involve storing round trip time samples of packets communicated over the downlink channel and samples of the congestion window parameter associated with the downlink channel. The estimated supported transmission rate may then be determined by calculating a ratio of the smoothed round trip time and smoothed congestion window based on the mean and maximum deviation of the samples of the round trip time and congestion window parameter, respectively. As described above, the estimation of the available transmission rate may be performed automatically by the operating system and networking stack associated with the exemplary service module of FIGS. 3A and 3B, thereby enabling the estimated transmission rate of the downlink channel to be retrieved when needed.

At step 620, the header information of the MP3 audio data is examined to determine the rate at which the MP3 audio data is encoded, and this encoding rate is compared with the estimated transmission rate of the downlink channel. If the estimated transmission rate of the downlink channel is greater than the rate at which the MP3 audio data is encoded at step 630, the MP3 audio data is transmitted to the intended destination at the estimated transmission using a transmission timer at step 660. On the other hand, if the estimated transmission rate of the downlink channel is less than rate at which the MP3 audio data is encoded, the estimated transmission rate is allocated to frames of the MP3 audio data at step 640 such that the average transmission rate of the frame sequence approximates the estimated transmission rate. In order to conform with the MP3 standard, MP3 frames must be encoded at fixed multiples of 8 kbps, with supported rates ranging from 32 kbps to 320 kbps. Accordingly, the allocation process of step 640 may be configured to assign encoding rates to each frame in permitted multiples of 8 kbps. For example, if the current estimated transmission rate of the downlink channel is 42 kbps, the estimated transmission rate may be allocated to the frames in the frame sequence such that the first frame is allocated 40 kbps, the second frame is allocated 32 kbps, and the third frame is allocated 48 kbps. The estimated transmission rate may be similarly allocated to subsequent frames in the frame sequence. By "multiplexing" between permitted encoding rates, the foregoing allocation process allows the exemplary method of the present invention to provide an MP3 data stream having an arbitrary transmission rate (dictated by the estimated transmission rate of the downlink channel), while conforming each frame of the MP3 data stream with the permitted encoding rates required by the MP3 standard.

The foregoing allocation process may be performed in a number of ways in accordance with embodiments of the present invention. In one embodiment, for example, the allocation process may be performed in accordance with a greedy algorithm such that frames occurring earlier in the frame sequence are allocated a higher encoding rate than frames occurring later in the frame sequence. This embodiment essentially attempts to maximize the encoding rate of each frame under examination without causing the running average transmission rate of the frame sequence to exceed the available transmission rate. In an alternative embodiment, the estimated transmission rate may be allocated based on the perceptual entropy of each frame. In this alternative embodiment, the perceptual entropy of a predetermined number of frames is calculated, and the combination of permitted encoding rates that provide an average encoding rate that approximates the available transmission rate is also determined. The highest permitted encoding rate in the combination is then allocated to the frame having the highest perceptual entropy and the next highest permitted encoding rate is allocated to the frame having the next highest perceptual entropy and so on. By allocating a higher encoding rate to frames having a higher perceptual entropy than frames having a lower perceptual entropy, this alternative embodiment optimizes the perceptual quality of the resulting data stream within the constraints imposed by the available transmission rate.

Once the estimated transmission rate has been allocated, the MP3 frames are then transcoded in accordance with the allocated transmission rate at step 650. This transcoding step may be performed in a number of ways depending on the desired quality and associated computations intensity. In one embodiment, the transcoding process may be performed by decoding the MP3 frame and then re-encoding the MP3 frame at the allocated transmission rate. This embodiment provides a relatively simple solution, but may involve relatively complicated and time-consuming computation. In another embodiment, the exemplary method may request a plurality of versions of the MP3 audio data, where each version is encoded at a different transmission rate. Because each frame of the plurality of versions encodes a predetermined number of audio samples (currently 1152 samples), frames of the plurality of versions may be multiplexed such that each frame in the frame sequence is selected from the version having the corresponding allocated transmission rate. The frames from the plurality of versions may need to be modified (e.g., by removing bits from the bit reservoir incorporated in some MP3 frames that are associated with data from subsequent frames) in order to remove any interdependencies.

In yet another embodiment, the transcoding process may be performed by removing a sufficient number of high frequency code words from each frame to conform the required transmission rate of the frame with the allocated transmission rate. This process may involve parsing the Huffman code words of each frame in accordance with the particular format in which the Huffman codewords are arranged and then removing high frequency code words from the frame until the required transmission rate of the frame meets the allocated transmission rate. For example, if the MP3 frame under examination is encoded using a 576 band frequency decomposition, the Huffman codewords for the frequency coefficients are arranged from lowest to highest frequency within the frame. Accordingly, in this example, the transcoding process would successively remove codewords at the end of the frame until the required transmission rate of the frame meets the allocated transmission rate. Alternatively, if the MP3 frame under examination is encoded using a 192 band frequency decomposition arranged in three windows, the Huffman codewords for the frequency coefficients are arranged from lowest to highest window and within each window the codewords are arranged from lowest to highest frequency. For this example, the high frequency codewords within each window would be successively removed until the required transmission rate of the frame meets the allocated transmission rate. The foregoing embodiment essentially applies a low pass filter to each frame in order to reduce the transmission rate of each frame, while preserving the more perceptually relevant low frequency data.

In still another embodiment, the transcoding process may be performed by mapping codewords within each frame to a decimated set of codewords having coarser quantization. For MP3 encoded data, the power-law quantized frequency coefficients are Huffman encoded using one of 32 possible Huffman tables that provide varying levels of compression and quantization error. Accordingly, this embodiment of the present invention may map the Huffman codewords from the frame under examination to a decimated set of codewords from a second Huffman table that has a coarser quantization. The second Huffman table may be selected based on the predicted compression ratio provided by the particular table (which are well-know parameters) and the amount by which the transmission rate of the frame under examination must be reduced in order to meet the allocated transmission rate. If the transmission rate of the frame does not meet the allocated transmission rate after the mapping is performed, the transmission rate of the frame may be further reduced by discarding the high frequency codewords in accordance with the embodiment described above. Although the resolution of frames transcoded in accordance with this embodiment has a coarser quantization (and therefore a higher quantization error), the foregoing process may provide a higher quality resulting signal than simply discarding all high frequency codewords.

Once the frames have been transcoded, the frame header and side information may be modified at step 655 to enable the receiver to properly recognize and process the transcoded data. For example, the header may be modified to indicated the new rate at which the frame has been encoded, and the side information may be modified to indicate the beginning of the frame and the length of the frame. The transcoded frames may then be transmitted to the receiver at step 660 at the estimated transmission rate using a transmission timer to regulate the timing of packet transmission.

It should be noted that the exemplary method may also include an optional step 657, which may be performed if the receiver includes a compatible client module (described in the embodiments of FIGS. 3A and 3B). The optional step may include embedding forward error correction codes, synchronization information, and/or ancillary data into the MP3 stream. Alternatively, the exemplary method may be configured to transmit this optional information over a separate UDP/IP channel.

It should also be emphasized that the embodiments of the present invention described above are generally applicable to multimedia information and should not be construed as limited to digital audio information. For example, multimedia standards, such as JPEG, MPEG-1, MPEG-2 and MPEG-4, typically encode image and video information for transmission at preselected transmission rates by converting the information to the frequency domain, quantizing the corresponding frequency coefficients, and compressing the quantized coefficients utilizing variable length codes. Due to the similarities in the techniques used to encode multimedia information, persons of ordinary skill in the art will appreciate that the systems and methods described herein may be generally applied to multimedia information, including, without limitation, audio, image and video.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A method for transcoding audio information using a service module disposed within a network communication system, the method comprising:
   breaking a connection between a transmitter and a receiver to form a first channel between the transmitter and the service module and a second channel between the service module and the receiver;
   redirecting a digital audio stream communicated from the transmitter to the receiver to the service module via the first channel, the digital audio stream encoded at the transmitter at a first transmission rate;
   estimating an available transmission rate of the second channel, wherein the estimating comprises measuring trip time of data packets communicated between the service module and receiver via the second channel;
   if the first transmission rate is greater than the available transmission rate, transcoding the digital audio stream at the service module to conform the digital audio stream to the available transmission rate; and
   transmitting the transcoded audio stream from the service module to the receiver over the second channel.

2. The method of claim 1, wherein the step of breaking comprises:
   terminating the connection between the transmitter and the receiver at the service module to form the first channel; and
   opening a separate connection between the service module and the receiver to form the second channel.

3. The method of claim 1, wherein the step of breaking is performed in response to the connection between the transmitter and receiver matching a predetermined criteria.

4. The method of claim 3, wherein the predetermined criteria comprises a set of classification rules that mask one or more fields of a header associated with the digital audio stream.

5. The method of claim 1, wherein the step of redirecting comprises modifying headers of the digital audio stream to replace an original destination address and destination port with a destination address and destination port associated with the service module.

6. The method of claim 1, wherein the step of redirecting comprises generating connection control parameters that cause data packets of the digital audio stream to be redirected to an application associated with the service module.

7. The method of claim 1, wherein the step of estimating comprises measuring a smoothed round trip time of data packets communicated from the service module to the receiver via the second channel.

8. The method of claim 7, wherein the step of estimating further comprises measuring a smoothed congestion window parameter associated with the second channel.

9. The method of claim 8, wherein the step of estimating further comprises calculating a ratio of the smoothed round trip time and the smoothed congestion window to estimate the available transmission rate.

10. The method of claim 1, wherein the step of transcoding comprises transcoding a sequence of frames of the digital audio stream such that an average transmission rate of the frame sequence approximates the estimated available transmission rate.

11. The method of claim 10, wherein the step of transcoding comprises transcoding the sequence of frames such that frames that occur earlier in the frame sequence are transcoded at a higher transmission rate than frames that occur later in the frame sequence.

12. The method of claim 10, wherein the step of transcoding comprises transcoding the sequence of frames such that frames having a higher perceptual entropy are transcoded at a higher transmission rate than frames having a lower perceptual entropy.

13. A method for transcoding audio information using a service module disposed within a network communication system, the method comprising:
   breaking a connection between a transmitter and a receiver to form a first channel between the transmitter and the service module and a second channel between the service module and the receiver;
   redirecting a digital audio stream communicated from the transmitter to the receiver to the service module via the first channel, the digital audio stream encoded at the transmitter at a first transmission rate;
   estimating an available transmission rate of the second channel;
   if the first transmission rate is greater than the available transmission rate, transcoding the digital audio stream at the service module to conform the digital audio stream to the available transmission rate; and
   transmitting the transcoded audio stream from the service module to the receiver over the second channel;
   wherein the step of transcoding comprises:
   requesting a plurality of versions of the digital audio stream from the transmitter, each version encoded at a different transmission rate; and
   multiplexing between the plurality of versions to form a sequence of frames that have an average transmission rate that approximates the estimated available transmission rate.

14. The method of claim 1, wherein the step of transcoding comprises:
   decoding the digital audio stream at the service module; and
   re-encoding the decoded audio stream at a lower transmission rate.

15. The method of claim 1, wherein the step of transcoding comprises removing high frequency code words from selected frames of the digital audio stream to form a sequence of frames that have an average transmission rate that approximates the estimated available transmission rate.

16. The method of claim 1, wherein the step of transcoding comprises mapping code words from selected frames of the digital audio stream to a decimated set of code words having coarser quantization to form a sequence of frames that have an average transmission rate that approximates the available transmission rate.

17. The method of claim 1, wherein the step of transmitting comprises transmitting the transcoded audio stream from the service module to the receiver in a manner transparent to the receiver.

18. The method of claim 17, wherein the step of transmitting comprises transmitting the transcoded audio stream from the service module using a source address and source port associated with the transmitter.

19. The method of claim 1, wherein the step of transmitting comprises using a transmission timer to provide timer-based data flow control, the period of the timer determined from the estimated available transmission rate.

20. The method of claim 1, further comprising embedding additional information within the transcoded digital audio stream.

21. The method of claim 20, wherein the step of embedding comprises embedding the additional information using a watermarking technique.

22. The method of claim 20, wherein the embedded information comprises at least one of a forward error correction code, synchronization information and ancillary information regarding the digital audio stream.

23. A method for transcoding multimedia information within a network communication system, the method comprising:
    intercepting digital multimedia information communicated between a transmitter and a receiver, the digital multimedia information encoded at the transmitter at a first transmission rate;
    estimating an available transmission rate of a receiver-side connection, wherein the estimating comprises measuring trip time of data packets communicated between the service module and receiver via the second channel;
    if the first transmission rate is greater than the available transmission rate, transcoding the digital multimedia information to conform the digital multimedia information to the available transmission rate; and
    transmitting the transcoded multimedia information to the receiver over the receiver-side connection at a transmission rate determined from the estimated available transmission rate.

24. The method of claim 23, wherein the step of transcoding comprises transcoding a sequence of frames of the digital multimedia information such that an average transmission rate of the frame sequence approximates the estimated available transmission rate.

25. The method of claim 24, wherein the step of transcoding comprises transcoding the sequence of frames such that frames that occur earlier in the frame sequence are transcoded at a higher transmission rate than frames that occur later in the frame sequence.

26. The method of claim 24, wherein the step of transcoding comprises transcoding the sequence of frames such that frames having a higher perceptual entropy are transcoded at a higher transmission rate than frames having a lower perceptual entropy.

27. A method for transcoding multimedia information within a network communication system, the method comprising:
    intercepting digital multimedia information communicated between a transmitter and a receiver, the digital multimedia information encoded at the transmitter at a first transmission rate;
    estimating an available transmission rate of a receiver-side connection;
    if the first transmission rate is greater than the available transmission rate, transcoding the digital multimedia information to conform the digital multimedia information to the available transmission rate; and
    transmitting the transcoded multimedia information to the receiver over the receiver-side connection at a transmission rate determined from the estimated available transmission rate;
    wherein the step of transcoding comprises:
    requesting a plurality of versions of the digital multimedia information from the transmitter, each version encoded at a different transmission rate; and
    multiplexing between the plurality of versions to form a sequence of frames that have an average transmission rate that approximates the estimated available transmission rate.

28. The method of claim 23, wherein the step of transcoding comprises:
    decoding the digital multimedia information; and
    re-encoding the decoded multimedia information at a lower transmission rate.

29. The method of claim 23, wherein the step of transcoding comprises removing high frequency code words from selected frames of the digital multimedia information to form a sequence of frames that have an average transmission rate that approximates the estimated available transmission rate.

30. The method of claim 23, wherein the step of transcoding comprises mapping code words from selected frames of the digital multimedia information to a decimated set of code words having coarser quantization to form a sequence of frames that have an average transmission rate that approximates the available transmission rate.

31. The method of claim 23, wherein the step of transmitting comprises transmitting the transcoded multimedia information to the receiver in a manner transparent to the receiver.

32. The method of claim 31, wherein the step of transmitting comprises transmitting the transcoded multimedia information using a source address and source port associated with the transmitter.

33. The method of claim 23, wherein the step of transmitting comprises using a transmission timer for regulating the transmission of each data packet, the transmission timer having the period determined from the estimated available transmission rate.

34. The method of claim 23, further comprising embedding additional information within the transcoded digital multimedia stream.

35. The method of claim 34, wherein the step of embedding comprises embedding the additional information using a watermarking technique.

36. The method of claim 34, wherein the embedded information comprises at least one of a forward error correction code, synchronization information and ancillary information regarding the digital multimedia information.

37. A system for transcoding multimedia information within a network communication system, the system comprising:
    a processor; and
    a memory unit, operably coupled to the processor, for storing instructions which when executed by the processor cause the processor to operate so as to:
        intercept digital multimedia information communicated between a transmitter and a receiver, the digital multimedia information encoded at the transmitter at a first transmission rate;
        estimate an available transmission rate of a receiver-side connection by measuring a trip time of data communicated between the service module and the receiver;
        if the first transmission rate is greater than the available transmission rate, transcode the digital multimedia information to conform the digital multimedia information to the available transmission rate; and transmit the transcoded audio stream to the receiver over the receiver-side connection at a transmission rate determined from the estimated available transmission rate.

38. The system of claim 37, wherein the instructions which cause the processor to operate so as to transcode cause the processor to operate so as to transcode a sequence of frames of the digital multimedia information such that an average transmission rate of the frame sequence approximates the estimated available transmission rate.

39. The system of claim 38, wherein the instructions which cause the processor to operate so as to transcode cause the processor to operate so as to transcode the sequence of frames such that frames that occur earlier in the frame sequence are transcoded at a higher transmission rate than frames that occur later in the frame sequence.

40. The system of claim 38, wherein the instructions which cause the processor to operate so as to transcode cause the processor to operate so as to transcode the sequence of frames such that frames having a higher perceptual entropy are transcoded at a higher transmission rate than frames having a lower perceptual entropy.

41. A system for transcoding multimedia information within a network communication system, the system comprising:

a processor; and a memory unit, operably coupled to the processor, for storing instructions which when executed by the processor cause the processor to operate so as to:

intercept digital multimedia information communicated between a transmitter and a receiver, the digital multimedia information encoded at the transmitter at a first transmission rate;

estimate an available transmission rate of a receiver-side connection;

if the first transmission rate is greater than the available transmission rate, transcode the digital multimedia information to conform the digital multimedia information to the available transmission rate; and transmit the transcoded audio stream to the receiver over the receiver-side connection at a transmission rate determined from the estimated available transmission rate;

wherein the instructions which cause the processor to operate so as to transcode cause the processor to operate so as to:

request a plurality of versions of the digital multimedia information from the transmitter, each version encoded at a different transmission rate; and multiplex between the plurality of versions to form a sequence of frames that have an average transmission rate that approximates the estimated available transmission rate.

42. The system of claim 37, wherein the instructions which cause the processor to operate so as to transcode cause the processor to operate so as to:

decode the digital multimedia information; and re-encode the decoded multimedia information at a lower transmission rate.

43. The system of claim 37, wherein the instructions which cause the processor to operate so as to transcode cause the processor to operate so as to remove high frequency code words from selected frames of the digital multimedia information to form a sequence of frames that have an average transmission rate that approximates the estimated available transmission rate.

44. The system of claim 37, wherein the instructions which cause the processor to operate so as to transcode cause the processor to operate so as to map code words from selected frames of the digital multimedia information to a decimated set of code words having coarser quantization to form a sequence of frames that have an average transmission rate that approximates the available transmission rate.

45. The system of claim 37, wherein the instructions which cause the processor to operate so as to transmit cause the processor to operate so as to transmit the transcoded multimedia information to the receiver in a manner transparent to the receiver.

46. The system of claim 37, wherein the instructions which cause the processor to operate so as to transmit cause the processor to operate so as to transmit the transcoded multimedia information using a source address and source port associated with the transmitter.

47. The system of claim 37, wherein the instructions which cause the processor to operate so as to transmit cause the processor to operate so as to transmit data packet in response to expiration of a transmission timer, the transmission timer having a period determined from the estimated available transmission rate.

48. The system of claim 37, wherein the memory unit further includes instructions which cause the processor to operate as to embed additional information within the transcoded multimedia stream.

49. The system of claim 48, wherein the instructions which cause the processor to operate so as to embed cause the processor to operate so as to embed the additional information using a watermarking technique.

50. The system of claim 48, wherein the embedded information comprises at least one of a forward error correction code, synchronization information and ancillary information regarding the digital multimedia information.

* * * * *